Oct. 14, 1930.  A. W. ALTHOFF  1,778,656
PARKING MECHANISM FOR MOTOR VEHICLES
Filed Feb. 20, 1928   4 Sheets-Sheet 1
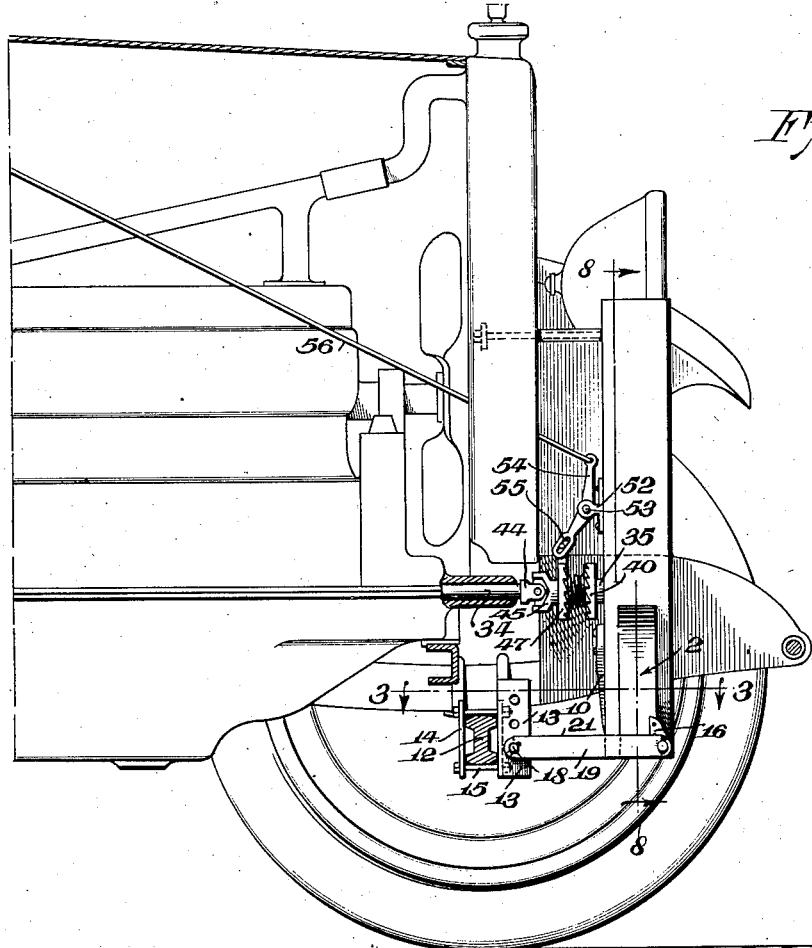
INVENTOR
A.W.Althoff.
BY
ATTORNEY Oct. 14, 1930.　　　A. W. ALTHOFF　　　1,778,656
PARKING MECHANISM FOR MOTOR VEHICLES
Filed Feb. 20, 1928　　　4 Sheets-Sheet 2
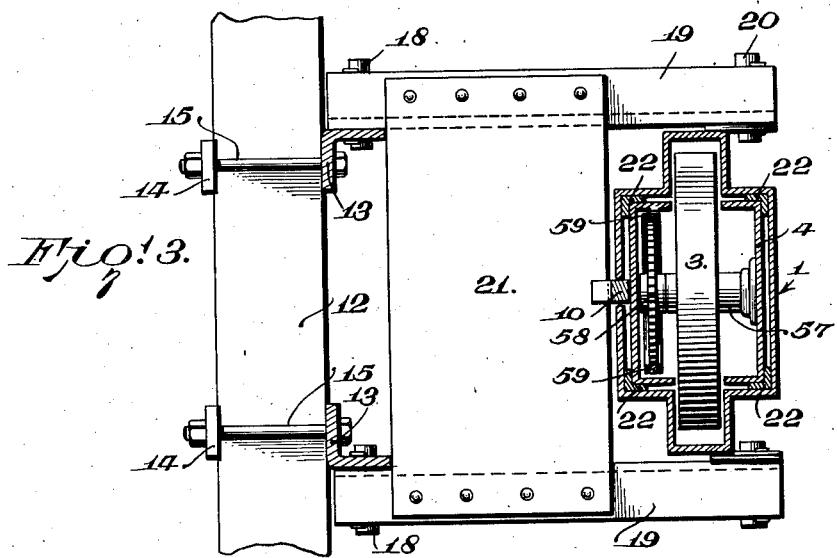
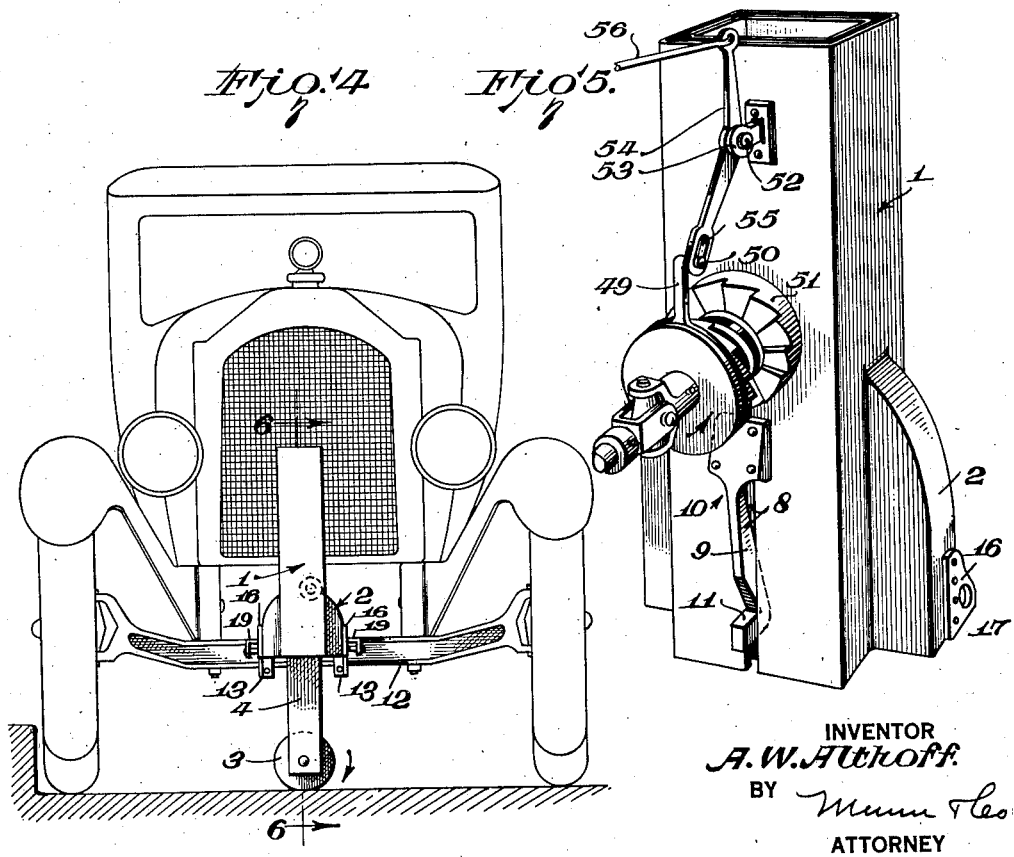
INVENTOR
A. W. Althoff.
BY
ATTORNEY

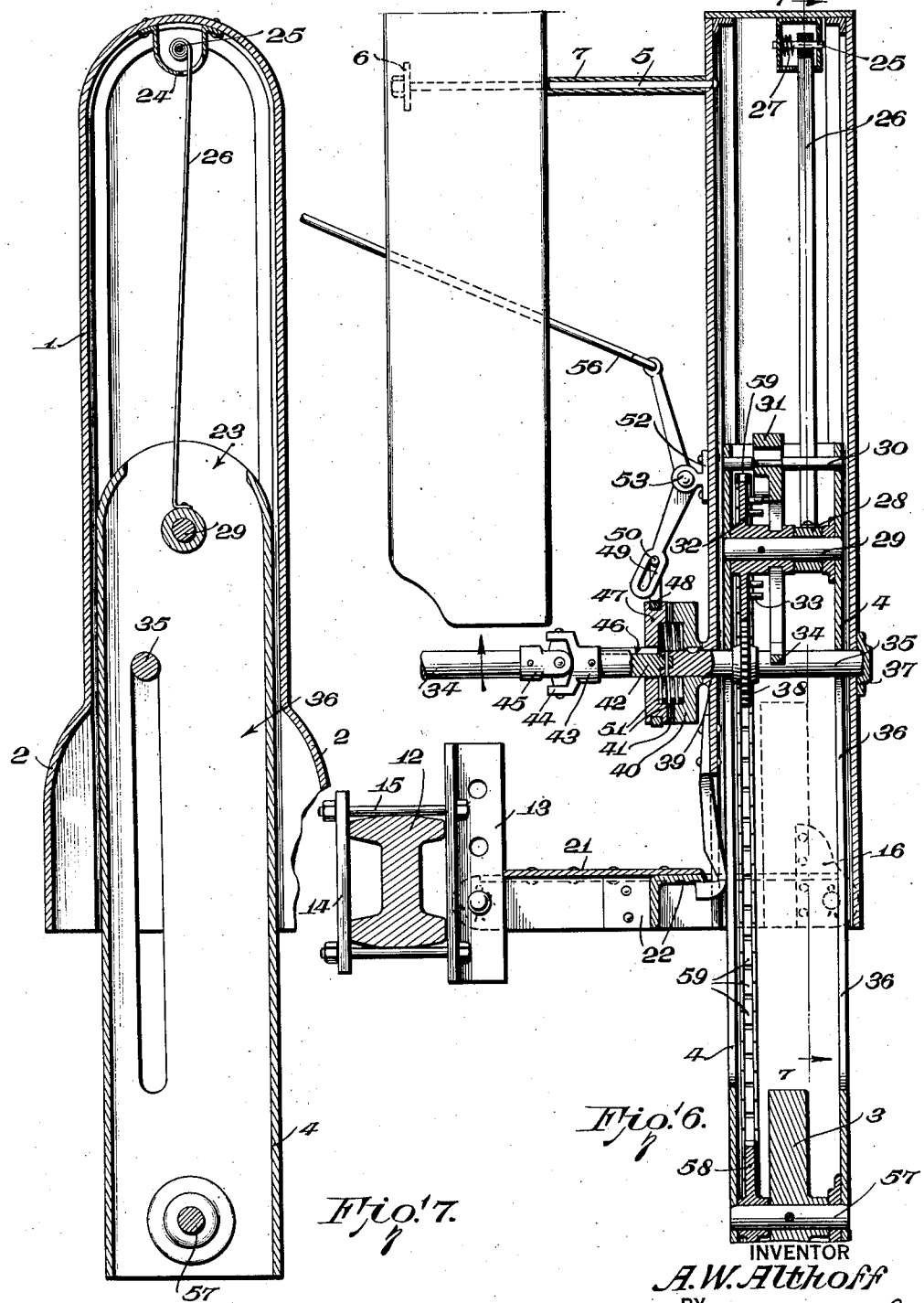

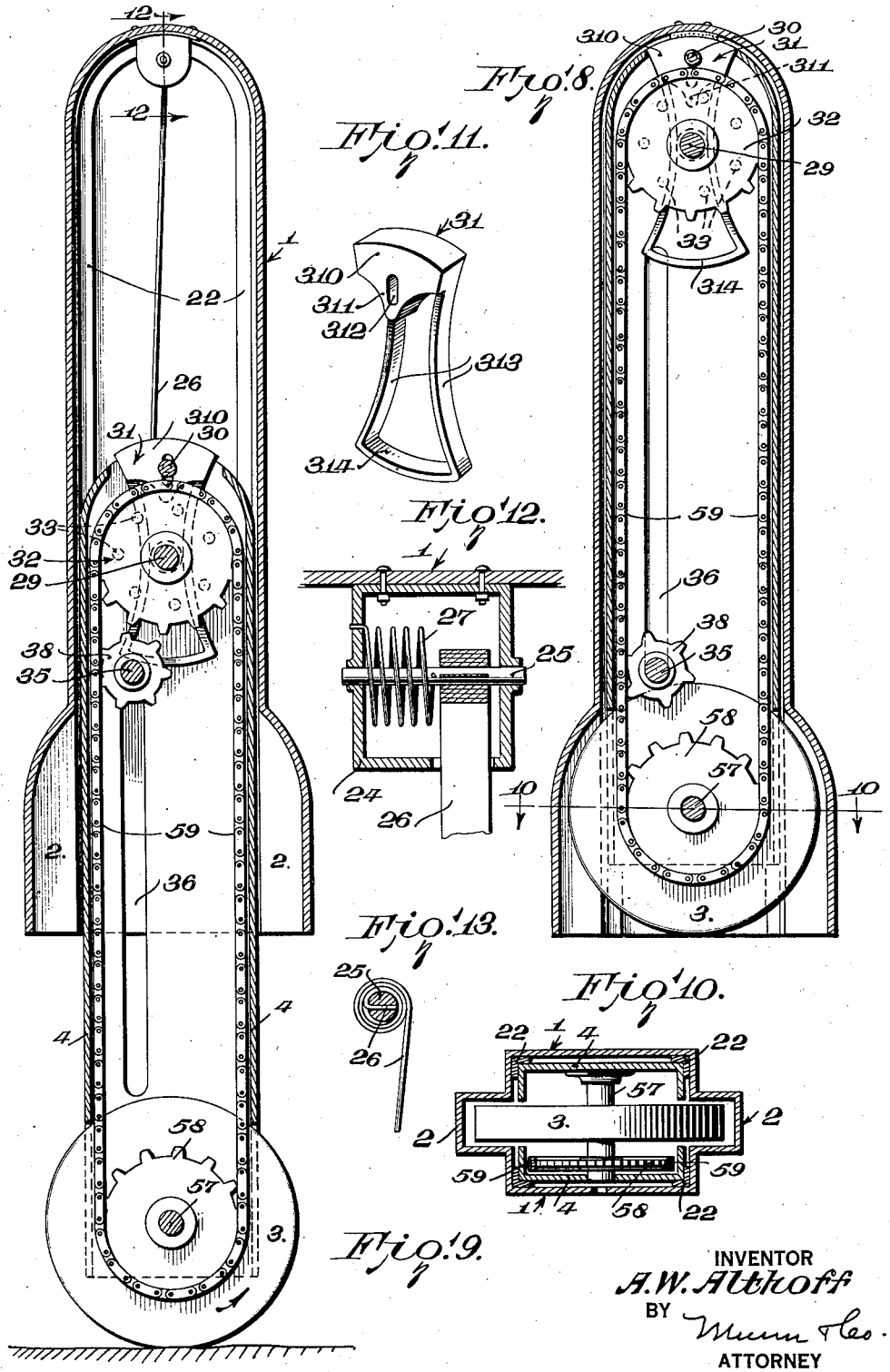

Patented Oct. 14, 1930

1,778,656

UNITED STATES PATENT OFFICE

AUGUST W. ALTHOFF, OF TULSA, OKLAHOMA

PARKING MECHANISM FOR MOTOR VEHICLES

Application filed February 20, 1928. Serial No. 255,763.

This invention relates to motor vehicles, and is more particularly concerned with an auxiliary mechanism for motor vehicles by means of which they may be extricated from a line of parked vehicles when separated from adjacent vehicles by spaces making it impossible to move the vehicle out of line by the normal steering mechanism.

Not only does such a mechanism permit close parking but, it permits removal of a vehicle parked originally with ample clearance but subsequently "trapped" in the line of parked vehicles as frequently happens, by movement of adjacent vehicles toward the parked vehicle greatly reducing the original clearance.

An object of the present invention is the provision of a fifth wheel mechanism powered from the motor drive of the vehicle and which is lowered to jack up one end of the vehicle and rotated to swing said end out of the line of parking. Such a mechanism has the additional function of a power jack for lifting one end of the vehicle for tire changes.

A further object of the invention is the provision of a powered fifth wheel mechanism of this type, whose construction is independent of that of the vehicle and which may be attached to standard forms of motor vehicles without alteration of their operating constructions.

Another feature of the invention is the provision of a fifth wheel mechanism powered from the motor drive of the vehicle and operating through said power drive to lower a normally elevated fifth wheel and automatically to turn said wheel when the vehicle end has been jacked up thereby to swing the end of the vehicle out of the parking line.

These and other objects and features of the advantages are more fully set forth in the following detailed specification which is to be read in conjunction with the accompanying drawings forming part thereof and in which:—

Figure 1 is a view in side elevation of the front end of a motor vehicle with the fifth wheel mechanism of the present invention attached thereto and in non-operating position, the front drive shaft bearing and the front axle being shown in section to illustrate the connection of this mechanism thereto.

Figure 2 is a diagrammatic plan view of a street and closely parked vehicle illustrating the manner of extricating a vehicle equipped with the present invention.

Figure 3 is a horizontal section taken on line 3—3 of Figure 1 showing the attachment of the fifth wheel mechanism to the front axle of a vehicle.

Figure 4 is a front elevation of a motor vehicle showing the mechanism as applied thereto with the fifth wheel lowered to jack up the front end preparatory to swinging it outwardly.

Figure 5 is a detail perspective of the fifth wheel casing with the wheel elevated and housed therein and showing the power clutch and axle attaching adjuncts.

Figure 6 is a vertical section on the line 6—6 of Figure 4, on an enlarged scale with the fifth wheel lowered.

Figure 7 is a transverse vertical section on the same scale taken on the line 7—7 of Figure 6.

Figure 8 is a transverse vertical section on an enlarged scale taken on the line 8—8 of Figure 1 with the fifth wheel elevated.

Figure 9 is a similar sectional view with the wheel lowered.

Figure 10 is a transverse horizontal section through the lower part of the wheel casing taken on the line 10—10 of Figure 8.

Figure 11 is a detail of the chain gear locking and releasing member.

Figure 12 is a sectional enlarged detail of the spring lift housing taken on the line 12—12 of Figure 9.

Figure 13 is a detail of the mounting of the lifting strap on the spring shaft in said housing.

The device of the present invention is applicable as an attachment to existing standard types of motor vehicles and is shown as applied to the front end of the vehicle and powered through connection to the crank shaft of its motor. The device proper is in the form of telescoping tubular sections with the outer section supported at its upper end from the front of the vehicle as, for example, by being attached to the radiator and at its lower end is supported from the front axle, this last support being a movable one permitting relative movement between the device and front axle in compensation for spring flexure. The outer tubular section 1 of the housing of the device is provided at its base with lateral extensions 2 forming a housing for the outer portons of a jacking and turning wheel 3 mounted at the lower end of the inner housing 4. The upper end of the outer housing is attachable to the front end (as shown) of the radiator of the motor vehicle by means of a long bolt 5 extending from the interior of the upper end of the housing through an abutment plate 6 in rear of the radiator and carrying a spacing sleeve 7 by means of which it is spaced from the front of the radiator. At its lower end, the outer tubular housing 1 is provided with an elongated slot 8 in its rear face in which extends the shank 9 of a supporting hook 10 riveted or otherwise rigidly attached at its upper end to the housing above the slot 8 and having its lower end notched to provide an engaging hook 11. This hook engages under the front edge of a gusset plate embracing and connecting part of the supporting frame for the lower end of the device and permits relative vertical movement between the plate and its notched side as the springs of the vehicle are flexed.

The support for the lower end of the outer housing 1 is best seen in Figures 3 and 6 and in a preferred form is as follows: Centrally of the front axle 12 of the vehicle and at the upper side thereof, short vertically extending lengths of angle iron 13 are bolted to rearwardly alined abutment plates 14 at the rear face of the axle 12, the clamping bolts 15 extending across the upper and lower faces of the axle. These angle iron plates are spaced apart at their outer faces a distance approximating the width of the outer housing 1 including the lateral extensions 2 thereof. These extensions which are positioned centrally of the housing have secured as by riveting to their rear edges and projecting forwardly therefrom, plates 16 having journaling openings 17 therein. Attached to the outer faces of the vertically extending angle irons 13 by pivot bolts 18 and extending laterally outward from the irons 13 are inverted channels 19, the forward ends of which terminate in line with the forward ends of the journaling plates 16 of the outer housing to which they are connected by means of removable pivot studs 20. Channels 19 are cross braced and rigidly connected as a unit by a gusset plate 21 having a length of angle 22 secured to the under face of its front edge and overlying the hook 11 projecting from the rear face of the outer casing 1. The mount provided by the pivoted channels 19 and their connecting gusset 21 may, therefore, move relatively to the axle 3 with the tubular housings 1 and 4 when the body and chassis of the motor vehicle move relatively to the front axle by means of flexure and rebound of the interposed vehicle springs.

The outer casing 1 in which the inner casing 4 telescopes is of rectangular cross section as shown and is braced at its corners by angle straps 22 which may conveniently be welded thereto and which constitute guides for the corners of the inner section 4. The upper ends of both inner and outer sections are rounded to facilitate nesting one within the other, the front end of the inner section being slotted as at 23 and substantially open to permit the housing 24 secured by its flanged edges to the inside face of the outer casing 1 to project therein when the two casings are telescoped fully. This housing 24 constitutes the casing for a spring drum whose shaft 25 is journaled therein and has fixed thereto the upper end of a steel tape 26 and one end of a coil spring 27, the other end of which is anchored to the housing 24 as best seen in Figure 12. The lower end of the steel tape is affixed to a collar 28 loosely encircling a shaft 29 journaled in the sides of the inner casing 4 adjacent to but below its upper end. At its upper end a stud 30 extends from front to rear of the casing and supports a locking member 31 which will be hereinafter described. Mounted upon the shaft 29 to rotate therewith and positioned below and to one side of the locking member 31 is a sprocket gear 32 having projecting forwardly from its front face an annular series of locking teeth 33 with which the locking member 31 cooperates.

Below the sprocket shaft 29 and in the mounted positions of the casings 1, 4 alined with the crank shaft 34 of the motor vehicle, an operating shaft 35 extends from front to rear of the outer casing 1 and through elongated alined vertical slots 36 in the front and rear walls of the inner casing 4. An adequate bearing for the front or outer end of this shaft is provided by a bearing cap plate 37 bolted to the front face of the outer casing 1 alined with the journaling opening for the shaft 35. This shaft mounts also in line with the sprocket gear 32, a driving sprocket 38 which as shown is of smaller diameter. The rear end of the shaft 35 extends through the rear walls of the casing 1 which as shown is formed with a boss 39 to provide adequate bearing therefor and has keyed thereto a drum 40 having its edge formed with a circumferential series of clutch teeth 41. The shaft 35 terminates rearwardly of the clutch drum 40 and has coupled thereto the outer end of a short stub shaft 42. A sleeve 43 on the outer end of one section of a universal joint 44 is pinned to the stub shaft 42 and the cooperating yoke member 45 of the universal joint coupling is pinned to the forward end of the crank shaft 34 at the point normally occupied by the crank pin. The form of universal joint coupling is immaterial and is conventionally illustrated herein. The stub shaft 42 outwardly of the coupling sleeve 43 is formed with a keyway 46 therein into which projects a cooperating key from a sliding clutch drum 47 having an annular groove in its periphery, housing a clutch ring 48 having an actuating arm 49 extending upwardly therefrom and provided with an offset end 50. Interposed between the movable clutch drum 47 and the clutch drum 40 fixed to the operating shaft 45 is a coil spring 51 normally effective to separate the clutch teeth. Above the drum 40, a bracket plate 52 is fixed to the rear face of the outer casing 1 and has a rearwardly extending arm 53 in which is journaled a bell crank lever 54, the lower end of which is formed with an elongated slot 55 through which the offset end 50 of the yoke ring arm 49 extends. A rod 56 extends from the upper end of the bell crank to the dash or instrument board of the vehicle where it may be provided with a suitable knob (not shown) for pulling the rod rearwardly. This movement through the bell crank is effective to move the clutch drums into engagement and to rotate the operating shaft 35 through the power of the vehicle motor when the latter is in operation and while the rod 56 continues to be pulled rearwardly.

The wheel 3 at the lower end of the inner casing 4 may be termed the road wheel and is mounted centrally of and to rotate with a shaft 57 journaled for rotation in suitable bearings provided in the front and rear walls of the casing 4 adjacent to its lower end. Rearwardly of the road wheel 3, a sprocket gear 58 is fixed to the shaft 57 in vertical alinement with the sprocket gears 38—32. A sprocket chain 59 is looped over and connects the sprocket gear 32 on shaft 29 and the sprocket gear 58 of the road wheel shaft, and is driven through the sprocket gear 38 on the operating shaft 35 which meshes with the chain at one side of the casing as best seen in Figure 9. The steel tape 26 normally tends to lift the inner housing 4 with its attached parts upwardly to nest within the outer casing through the tension of its coil spring 27 when the clutch drums are disconnected, being aided in this operation by the weight of the vehicle pressing against the road wheel. The inner and outer casings therefore in their inactive or non-functioning positions are in nested relation with the parts in the position shown in Figure 8. The locking member 31 previously referred to and suspended upon the stud 30 at the open upper end of the inner casing 4 cooperates with the upper sprocket gear 32 and with the operating shaft 35 to permit power operation of the shaft first to lower the inner casing to engage the road wheel with the ground, and thereafter to continue to lower the inner casing to a predetermined extent to jack up the front end of the vehicle and thereafter automatically to rotate the road wheel to effect transverse swinging movement of the elevated front end of the vehicle until the clutch is released, whereupon weight of the vehicle will elevate the road wheel and inner casing until the front wheels of the vehicle touch the ground, the tensioned coil spring 27 thereafter being effective through the steel tape 26 to continue the elevating movement until the inner casing is fully nested in the outer casing. The locking member 31 permitting and controlling this operation of the sprocket chain is shown in detail in Figure 11 and is in the form of a curved head 310 conforming to the internal curvature of the top of the outer casing and having a depending tapering locking tooth 311 with an elongated slot 312 extending through the head portion transversely thereof and elongated vertically of the head. The stud or pin 30 is inserted through this slot in the assembly of the inner casing and supports it for limited vertical movement thereafter. Laterally offset from the head 310 and depending therefrom are spaced curved arms 313 which embrace and guide in an annular groove formed in the hub of the sprocket wheel 32 and extends below, terminating in a connecting cross bar 314 constituting a release abutment. The tapering tooth 311 in the nested and inoperative position of the casing normally drops by gravity to rest between adjacent locking studs 33 of the sprocket wheel 32 as indicated in Figure 8. In this position of the parts assuming that it is desired to jack up the front end of the motor vehicle and swing it outwardly, for example, from the curb edge of a street or roadway, connection of the operating shaft 35 through the clutch member 47 with the crank shaft of the vehicle motor will through the engagement of the sprocket gear 38 of the shaft 35 with the sprocket chain 59 force the inner casing 4 downwardly. The locking member 31 since it locks the upper sprocket gear 32 against rotation, causes the sprocket chain 59 to function as a rack so that power rotation of the operating shaft sprocket 38 will be effective to lower the inner casing until its road wheel engages the ground and jacks up said front end. When the inner casing has been lowered to bring the sprocket gear 32 in juxtaposition to the shaft sprocket 38, the abutment arm 314 of the locking member 31 will engage the shaft 35, lifting the locking tooth 311 from between the adjacent locking teeth 33 of the upper sprocket gear and permits continued rotation of the shaft 35 to turn the sprocket chain 59 and the road wheel 3 through the rotation of the sprocket gear 58 on the road wheel shaft, whereby swinging the front end of the vehicle transversely. The particular connections shown are effective to cause rotation of the road wheel to the left as indicated by the arrows in Figures 1, 4–6 and as shown by the diagram in Figure 2 in which parked motor vehicles A and B at opposite sides of and parallel to the edge of a roadway or street S may be swung outwardly in the direction of the arrows and extricated from between adjacent front and rear vehicles positioned so closely thereto as otherwise to trap them against removal through the normal steering connections of the vehicle. Conversely, this direction of rotation is useful in effecting parking of the vehicle at the left side of a street or roadway parallel with its edges where the spacing between adjacent vehicles would not permit such parking through the ordinary steering control. Additionally, the jacking function of the road wheel may be used to elevate the front end of the vehicle for the removal and replacement of tires. This may be effected by starting the motor of a vehicle, operating the clutch rod 56 to lift the vehicle and stopping the motor with the latter in gear with the rear wheels, while the clutch 47 is held in engagement. Obviously suitable means may be provided for retaining the rod 56 in clutch engaging position. The operation of the device will be clear from the foregoing description and need not be recapitulated here in detail. It presents a compact form of apparatus available as an attachment for all standard forms of vehicles without modification of their structural features aside from the replacement of the clutch pin by the universal joint coupling 45 and when not in use is positioned out of the way and does not interfere with the normal functions and operation of the vehicle. The particular form of the device described and illustrated, while representing a practical and preferable form of the invention is intended as illustrative thereof only, and not as restrictive; and various structural changes and modifications adapting the invention to different conditions and constructions of vehicles is contemplated in consonance with the spirit of the invention and the scope of the appended claims.

What I claim therefore, and desire to secure by Letters Patent:—

1. A jacking and traversing mechanism for one end of a motor vehicle comprising inner and outer telescoping tubular casings fixed centrally to and extending vertically of one end of the vehicle, a fifth wheel mounted in the lower end of the inner casing for rotation about an axis extending longitudinally of the vehicle and for bodily vertical movement with said inner casing toward and from the ground, a transverse operating shaft mounted in said outer casing and extending through alined vertical slots in said inner casing, means including a clutch for connecting said operating shaft with a motor driven shaft of the vehicle, means normally tending vertically to elevate and telescope said inner casing in the outer casing, and mechanism housed within said tubular casings driven from said operating shaft and powered through its connection to said motor driven shaft for lowering said inner casing and fifth wheel to jack up the end of the vehicle, said mechanism being subsequently and automatically operable to rotate said wheel to swing the connected end of the vehicle transversely.

2. A parking and traversing mechanism for one end of a motor vehicle comprising inner and outer telescoping casings mounted centrally and extending vertically at one end of the vehicle, a fifth wheel mounted in the lower end of the inner casing for rotation about an axis extending longitudinally of the vehicle and for bodily vertical movement with said inner casing toward and from the ground, a transverse operating shaft mounted in said outer casing and extending through alined vertical slots in said inner casing, a sprocket gear on said shaft, an alined sprocket gear on said fifth wheel, a third alined sprocket gear journaled at the upper end of said inner casing, a sprocket chain encircling said upper and wheel sprocket gears and engaged by said shaft gear, means operative in the elevated position of wheel and inner casing to lock said upper gear against rotation, thereby to cause said chain to function as a rack to lower the inner casing and wheel to jack up the end of the vehicle through rotation of said operating shaft, with means automatically operative to release said locking means upon predetermined lowering movement of said casing and wheel to cause continued rotation of said shaft to rotate said sprocket gears to rotate the wheel and swing the vehicle end transversely.

3. A jacking and traversing mechanism for the front end of motor vehicles comprising inner and outer telescoping casings mounted centrally and extending vertically in front of the vehicle, means connecting the upper and lower ends of the outer casing to the radiator and front axle for relative vertical movement in compensation for spring flexure, a fifth wheel mounted in the lower end of the inner casing for rotation about an axis extending longitudinally of the vehicle and for bodily vertical movement with said inner casing toward and from the ground, means normally tending and effective to elevate and telescope said inner case and wheel in the outer casing, a transversely extending operating shaft journaled in said outer casing and extending through alined vertical slots in the inner casing, means coupling said shaft to the crank shaft of the vehicle motor including a clutch and shifting means therefor, a sprocket gear on said operating shaft, an alined sprocket gear on said fifth wheel, a third alined sprocket gear journaled at the upper end of said inner casing, a gravity locking member mounted adjacent thereto for movement toward and from locking engagement with said gear and having a releasing abutment vertically alined with said operating shaft, a chain encircling said upper and wheel sprocket gears and engaged by said shaft sprocket gears, said locking means conditioning the chain to function as a rack in the elevated position of the inner casing and wheel to cause rotation of the operating shaft to lower said inner casing and wheel to jack up the front end of the vehicle until said abutment engages said shaft to release said locking means and thereafter to turn said upper and wheel sprockets to rotate the wheel and swing the front end of the vehicle transversely.

4. A jacking and traversing mechanism for the end of a motor vehicle comprising a casing of complemental tubular sections mounted centrally on and extending vertically of and at one end of the vehicle, means supporting the upper and lower ends of the outer of said casing sections on the vehicle end for movement relatively to the vehicle axis in compensation for spring flexure, a fifth wheel mounted in the inner of said casing sections for bodily vertical movement therewith relatively to the outer casing section and toward and from the ground and for independent rotation about an axis extending longitudinally of the vehicle, and means powered by the motor of the vehicle housed within said casing sections and operable at will bodily to lower said inner casing section and its wheel to jack up the connected end of the vehicle and thereafter to rotate said wheel to swing the elevated end of the vehicle transversely.

5. A jacking and traversing mechanism for the front ends of motor vehicles comprising a casing of inner and outer tubular telescoping sections with the outer section affixed centrally and extending vertically of the front end of the vehicle forwardly of the front axle thereof, a fifth wheel mounted in the lower end of the inner of said sections for bodily vertical movement therewith toward and from the ground and for rotation about an axis extending longitudinally of the vehicle, mechanism housed within said casing sections, including an operating shaft powered from the motor drive, operable at will bodily to lower said inner section and its wheel to jack up the front end of the vehicle and thereafter to rotate said wheel to swing the front end of the vehicle transversely, and means connecting said operating shaft with the crank shaft of the vehicle motor including a clutch and shifting means therefor.

6. A jacking and traversing mechanism for the front end of a motor vehicle comprising a casing of inner and outer tubular telescoping sections mounted centrally and extending vertically of the front of the vehicle radiator, means supporting the upper end of the outer casing section from the radiator, a vertically yielding support connecting the lower end of said outer casing section and the front axle, a fifth wheel mounted in the lower end of the inner casing section for bodily vertical movement therewith toward and from the ground and for rotation about an axis extending longitudinally of the vehicle, and mechanism housed within said casing sections for raising and lowering the inner casing section with its wheel and for independently rotating said wheel to swing the end of the vehicle.

7. A jacking and traversing mechanism for the front ends of motor vehicles comprising a casing of complemental tubular telescoping sections mounted centrally and extending vertically of the front end of the vehicle forwardly of the front axle thereof, with the outer of said telescoping sections affixed to the front end of the vehicle, a fifth wheel mounted on the lower end of the inner casing section for bodily vertical movement therewith toward and from the ground and for rotation about an axis extending longitudinally of the vehicle, mechanism housed within said casing sections, including an operating shaft carrying a sprocket gear, a sprocket gear on said fifth wheel, a chain drive from said operating shaft gear to said wheel gear operable by rotation of said shaft bodily to lower said wheel to jack up the front end of the vehicle and thereafter operative to rotate said wheel to swing the front end of the vehicle transversely, said operating shaft being extended through and rearwardly of the outer casing sections, and means for coupling said shaft to the motor shaft of the vehicle including a clutch and shifting means therefor.

Signed at Tulsa in the county of Tulsa and State of Oklahoma this 14th day of February, A. D. nineteen hundred twenty-eight.

AUGUST W. ALTHOFF.